(12) United States Patent
Harris et al.

(10) Patent No.: US 10,503,041 B2
(45) Date of Patent: Dec. 10, 2019

(54) LAMINATED ELECTRO-OPTIC DISPLAYS AND METHODS OF MAKING SAME

(71) Applicant: E INK CORPORATION, Billerica, MA (US)

(72) Inventors: George G. Harris, Woburn, MA (US); Richard J. Paolini, Jr., Framingham, MA (US); Matthew Joseph Kayal, Franklin, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/802,571

(22) Filed: Nov. 3, 2017

(65) Prior Publication Data

US 2018/0149942 A1 May 31, 2018

Related U.S. Application Data

(60) Provisional application No. 62/427,970, filed on Nov. 30, 2016.

(51) Int. Cl.
*G02B 26/00* (2006.01)
*G02F 1/167* (2019.01)
(Continued)

(52) U.S. Cl.
CPC ............ *G02F 1/167* (2013.01); *G02F 1/1345* (2013.01); *G02F 1/13336* (2013.01); *G02F 1/1676* (2019.01)

(58) Field of Classification Search
CPC ............ G02F 1/1368; G02F 1/133345; G02F 2201/123; G02F 1/1339; G02F 1/136204;
(Continued)

(56) References Cited

U.S. PATENT DOCUMENTS

| 5,760,761 A | 6/1998 | Sheridon |
| 5,777,782 A | 7/1998 | Sheridon |

(Continued)

FOREIGN PATENT DOCUMENTS

| JP | 2010107647 A | 5/2010 |
| WO | 2010050404 A1 | 5/2010 |
| WO | 2011136474 A2 | 11/2011 |

OTHER PUBLICATIONS

Korean Intellectual Property Office, PCT/US2017/061710, International Search Report and Written Opinion, dated Mar. 23, 2018. Mar. 23, 2018.

(Continued)

*Primary Examiner* — Brandi N Thomas
(74) *Attorney, Agent, or Firm* — Brian D. Bean (57) ABSTRACT

A method of forming an electrophoretic display is provided that includes forming a front plane laminate having a first substrate, a first conductive layer, a layer of electrophoretic media, and an adhesive, as well as coating an insulating layer and a second conductive layer onto a second substrate to provide a backplane. The first substrate and first conductive layer may be transparent, and the second substrate may include a plurality of conductors. The method may further include scoring the second substrate to provide a removable portion, laminating the front plane laminate to the backplane, removing the portion from the second substrate to provide an opening in the backplane, and filling the opening with a conductive material to provide an electrical connection between the first conductive layer and one of the plurality of conductors. Electrophoretic displays made according to the various methods are also provided.

12 Claims, 6 Drawing Sheets

(51) Int. Cl.
*G02F 1/1345* (2006.01)
*G02F 1/1333* (2006.01)
*G02F 1/1676* (2019.01)

(58) Field of Classification Search
CPC .......... G02F 1/13338; G02F 1/136286; G02F 2202/28; G02F 1/134309; G02F 1/13439; G02F 1/13452; G02F 1/1345; G02F 1/13458; G02F 1/136227; G02F 2001/136231; G02F 2001/136295; G02F 2202/103; G02F 2202/105; G02F 1/133553
USPC ................ 359/237, 242, 265–267, 270–273, 359/290–292, 295, 296, 298
See application file for complete search history.

(56) References Cited

U.S. PATENT DOCUMENTS

| | | | |
|---|---|---|---|
| 5,808,783 A | 9/1998 | Crowley | |
| 6,054,071 A | 4/2000 | Mikkelsen, Jr. | |
| 6,055,091 A | 4/2000 | Sheridon | |
| 6,097,531 A | 8/2000 | Sheridon | |
| 6,128,124 A | 10/2000 | Silverman | |
| 6,137,467 A | 10/2000 | Sheridon | |
| 6,147,791 A | 11/2000 | Sheridon | |
| 6,241,921 B1 | 6/2001 | Jacobson | |
| 6,301,038 B1 | 10/2001 | Fitzmaurice | |
| 6,312,304 B1 * | 11/2001 | Duthaler | B41J 3/4076 313/506 |
| 6,822,782 B2 | 11/2004 | Honeyman | |
| 6,866,760 B2 | 3/2005 | Paolini, Jr. | |
| 6,870,657 B1 | 3/2005 | Fitzmaurice | |
| 6,922,276 B2 | 7/2005 | Zhang et al. | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner | |
| 7,012,735 B2 | 3/2006 | Honeyman et al. | |
| 7,072,095 B2 | 7/2006 | Liang | |
| 7,075,502 B1 | 7/2006 | Drzaic | |
| 7,116,318 B2 | 10/2006 | Amundson | |
| 7,144,942 B2 | 12/2006 | Zang | |
| 7,173,752 B2 | 2/2007 | Doshi et al. | |
| 7,223,672 B2 | 5/2007 | Kazlas et al. | |
| 7,312,784 B2 | 12/2007 | Baucom et al. | |
| 7,339,715 B2 | 3/2008 | Webber et al. | |
| 7,342,068 B2 | 3/2008 | Klingenberg | |
| 7,411,719 B2 | 8/2008 | Paolini, Jr. et al. | |
| 7,420,549 B2 | 9/2008 | Jacobson | |
| 7,453,445 B2 | 11/2008 | Amundson | |
| 7,535,624 B2 | 5/2009 | Amundson et al. | |
| 7,561,324 B2 | 7/2009 | Duthaler et al. | |
| 7,679,814 B2 | 3/2010 | Paolini, Jr. et al. | |
| 7,715,088 B2 | 5/2010 | Liang | |
| 7,733,554 B2 | 6/2010 | Danner et al. | |
| 7,839,564 B2 | 11/2010 | Whitesides et al. | |
| 7,843,624 B2 | 11/2010 | Danner | |
| 8,009,348 B2 | 8/2011 | Zehner | |
| 8,576,162 B2 | 11/2013 | Kang | |
| 8,848,388 B2 | 9/2014 | Sato | |
| 9,238,340 B2 | 1/2016 | Kayal | |
| 9,279,906 B2 | 3/2016 | Kang | |
| 9,419,142 B2 * | 8/2016 | Morisue | H01L 27/1214 |
| 9,563,099 B2 | 2/2017 | LeCain et al. | |
| 10,042,189 B2 | 8/2018 | Forster | |
| 2014/0043378 A1 | 2/2014 | Inoue et al. | |
| 2015/0005720 A1 | 1/2015 | Zang | |
| 2015/0277160 A1 | 10/2015 | Laxton | |
| 2016/0012710 A1 | 1/2016 | Lu | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Wood, D., "An Electrochromic Renaissance?" Information Display, 18(3), 24 (Mar. 2002) Mar. 1, 2002.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

European Patent Office, EP Appl. No. 17875756.3, Extended European Search Report, dated Sep. 9, 2019.

* cited by examiner

LAMINATED ELECTRO-OPTIC DISPLAYS AND METHODS OF MAKING SAME

CROSS REFERENCE TO RELATED APPLICATION

This application claims the benefit of and priority to U.S. Provisional application having Ser. No. 62/427,970, filed on Nov. 30, 2016, the content of which is incorporated herein in its entirety.

FIELD OF THE INVENTION

This invention relates to laminated electro-optic displays and the processes for the production of electrophoretic displays. More specifically, in one aspect this invention relates to a method of manufacturing a laminated electro-optic display to provide a top plane connector (TPC), i.e. an electrical connection between the conductors in a backplane and the conductive layer of the front plate laminate.

BACKGROUND

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. Nos. 6,241,921 and 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see, for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

Electro-optic displays, including electrophoretic displays, can be costly; for example, the cost of the color LCD found in a portable computer is typically a substantial fraction of the entire cost of the computer. As the use of such displays spreads to devices, such as cellular telephones and personal digital assistants (MA's), much less costly than portable computers, there is great pressure to reduce the costs of such displays. The ability to form layers of electrophoretic media by printing techniques on flexible substrates, as discussed above, opens up the possibility of reducing the cost of electrophoretic components of displays by using mass production techniques such as roll-to-roll coating using commercial equipment used for the production of coated papers, polymeric films and similar media. However, the ability to utilize roll-to-roll coating for the purpose of mass-production of electro-optic displays having relatively large dimensions is limited due to the need for precise alignment of the front plane laminate and backplane.

Thus, there is a need for improved mass production techniques associated with the manufacture of laminated electro-optic displays.

SUMMARY OF THE INVENTION

According to one embodiment of the present invention, a method of forming an electrophoretic display is provided. The method may include forming a front plane laminate comprising, in this order, a first substrate, a first conductive layer, a layer of electrophoretic media, and an adhesive, as well as coating an insulating layer and a second conductive layer onto a second substrate to provide a backplane. The first substrate and first conductive layer may be transparent, and the second substrate may include a plurality of conductors. The method may further include scoring the second substrate to provide a removable portion, laminating the front plane laminate to the backplane, removing the portion from the second substrate to provide an opening in the backplane, and filling the opening with a conductive material to provide an electrical connection between the first conductive layer and one of the plurality of conductors.

According to another embodiment of the present invention, a laminated electrophoretic display is provided. The display may comprise a front transparent substrate, a rear substrate having a plurality of conductors, and a plurality of layers between the front substrate and the rear substrate. The plurality of layers may include a layer of electrophoretic media, a first conductive layer positioned between the front substrate and the electrophoretic media, and a second conductive layer positioned between the electrophoretic media and the rear substrate. The rear substrate may also include a through-hole filled with a conductive material such that at least one of the plurality of conductors is electrically connected via the conductive material to the first conductive layer.

These and other aspects of the present invention will be apparent in view of the following description.

BRIEF DESCRIPTION OF THE FIGURES

The drawing Figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

The various examples described in this section relate to a method for forming a display through a non-precision lamination technique while also allowing for small, precisely located top plane connections. Generally, according to an embodiment of the present invention, the backplane may be provided with a hole that extends through the end portion of a conductor that is formed in the backplane. After lamination, the top conducting layer of the front plane laminate may be cleaned of electrophoretic media and lamination adhesive through the hole in the backplane. This exposes the top conducting layer and allows for a conductive dispensable filler to be loaded into the hole in order to make an electrical connection between the top conducting layer and the conductor embedded in the backplane.

Referring to the figures generally, a laminated electrophoretic display is provided comprising a front transparent substrate; a rear substrate having a plurality of conductors; and a plurality of layers between the front substrate and the rear substrate, the plurality of layers comprising a layer of electrophoretic media, a first conductive layer positioned between the front substrate and the electrophoretic media, and a second conductive layer positioned between the electrophoretic media and the rear substrate, wherein the rear substrate includes a through-hole filled with a conductive material such that at least one of the plurality of conductors is electrically connected via the conductive material to the first conductive layer.

Various embodiments of the present invention also include a method of forming an electrophoretic display. The method comprises forming a front plane laminate comprising, in this order, a first substrate, a first conductive layer, a layer of electrophoretic media, and an adhesive, the first substrate and first conductive layer being transparent; coating an insulating layer and a second conductive layer onto a second substrate comprising a plurality of conductors to provide a backplane; scoring the second substrate to provide a removable portion; laminating the front plane laminate to the backplane; removing the portion from the second substrate to provide an opening in the backplane; and filling the opening with a conductive material to provide an electrical connection between the first conductive layer and one of the plurality of conductors.

The portion in the second substrate in the above described method may be cut in proximity to the one conductor. The scoring step may also occurs either prior to or after coating the second substrate with the insulating layer and the second conductive layer. The removing step may expose the electrophoretic media and adhesive within the opening, so that at least some of the electrophoretic media and adhesive within the opening after the laminating step to expose the first conductive layer may be cleaned away and/or removed. The portion of the second substrate may be cut into the form of a flap. Furthermore, the second conductive layer may be applied to two opposing surfaces of the second substrate.

Reference now is made in detail to the examples illustrated in the accompanying drawings and discussed below.

Figure 1:
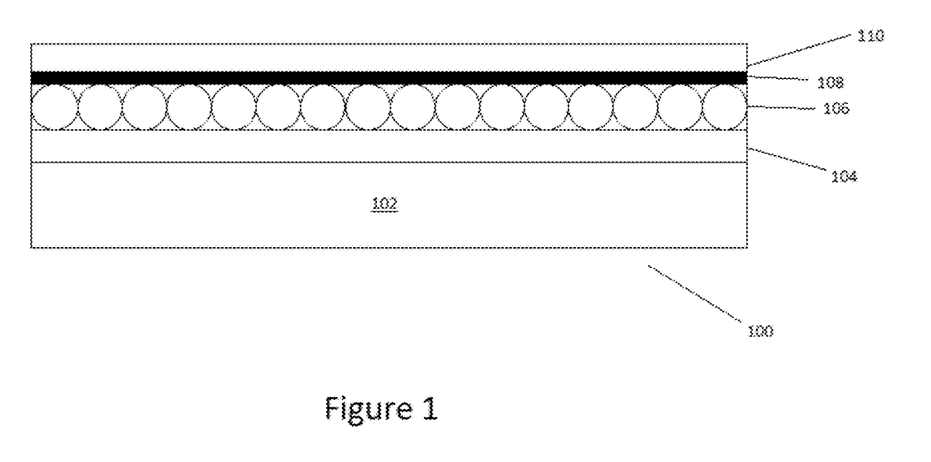
FIG. 1 is a schematic cross-section through a front plane laminate used in a process according to an embodiment of the present invention.

In FIG. 1, a schematic cross-section of a front plane laminate ("FPL") 100 is provided. The FPL 100 is similar to those described in aforementioned U.S. Pat. No. 6,982,178, the contents of which are incorporated herein by reference. The FPL 100 may comprise, in order, a light-transmissive electrically-conductive layer; a layer of a solid electro-optic medium in electrical contact with the electrically-conductive layer; an adhesive layer; and a release sheet. Typically, the light-transmissive electrically-conductive layer 104 is applied to a light-transmissive substrate 102, which is preferably flexible, in the sense that the substrate can be manually wrapped around a drum 10 inches (254 mm) in diameter, for example, without permanent deformation. The term "light-transmissive" is used herein throughout the specification and claims to mean that the layer thus designated transmits sufficient light to enable an observer, looking through that layer, to observe the change in display states of the electro-optic medium, which will normally be viewed through the electrically-conductive layer and adjacent substrate (if present); in cases Where the electro-optic medium displays a change in reflectivity at non-visible wavelengths, the term "light-transmissive" should of course be interpreted to refer to transmission of the relevant non-visible wavelengths. The substrate 102 may be manufactured from glass or a polymeric film, for example, and may have a thickness in the range of about 1 to about 25 mil (25 to 634 µm), preferably about 2 to about 10 mil (51 to 254 µm). The top conductive layer 104 may comprise a thin metal or metal oxide layer of, for example, ITO, or may be a conductive polymer, such as PEDOT.

A coating of electro-optic medium 106 is applied over the top conductive layer 104, such that the electro-optic medium 106 is in electrical contact with the top conductive layer 104. The electro-optic medium 106 may, preferably, be in the form of an opposite charge dual particle encapsulated electrophoretic medium of the type described in U.S. Patent Application 2002/0185378, the contents of which are incorporated by reference herein. The medium may comprise dispersion media encapsulated within a binder. The dispersion media may contain a hydrocarbon-based liquid in which are suspended negatively charged white particles and positively charged black particles. Upon application of an electrical field across the electro-optic medium 106, the white particles may move to the positive electrode and the black particles may move to the negative electrode, for example, so that the electro-optic medium 106 appears, to an observer viewing the display through the substrate 102, white or black depending upon whether the top conductive layer 104 is positive or negative relative to the backplane at any point within the final display. The electro-optic medium 106 may alternatively comprise a plurality of colored particles in addition to black and/or white particles, for example, each color having a respective charge polarity and strength.

A layer of lamination adhesive 108 may be coated over the electro-optic medium layer 106, and a release layer 110 may be applied over the adhesive layer 108. The release layer 110 may be a PET film, for example, that is approximately 7 mil in thickness, which may be provided with any appropriate release coating, for example a silicone coating. The presence of this lamination adhesive layer affects the electro-optic characteristics of the displays. In particular, the electrical conductivity of the lamination adhesive layer affects both the low temperature performance and the resolution of the display. The low temperature performance of the display may be improved by increasing the conductivity of the lamination adhesive layer, for example by doping the layer with tetrabutylammonium hexafluorophosphate or other materials as described in U.S. Pat. Nos. 7,012,735 and 7,173,752, the contents of which are incorporated by reference herein. The FPL may optionally include a thin second conductive layer, preferably of aluminum, between the release sheet 110 and the laminate adhesive 108 that may be removed with the release sheet 110. The second conductive layer may be used for testing of the electro-optic medium.

The FPL may also be provided in other forms, such as a "double release sheet" as described in U.S. Pat. No. 7,561,324 or an "inverted front plane laminate", as described in U.S. Pat. No. 7,839,564, the contents of both of which are incorporated herein by reference in their entireties.

Figure 2A:
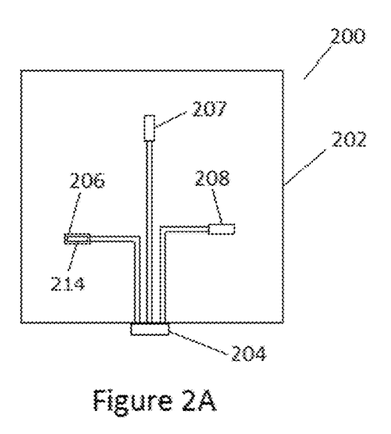
FIG. 2A is a schematic top plan view of a substrate of a backplane used in a process according to an embodiment of the present invention.
Figure 2B:
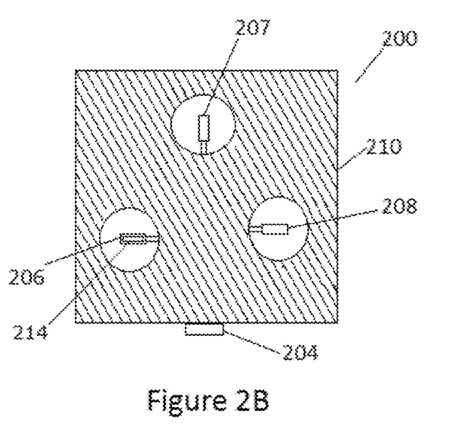
FIG. 2B is a schematic top plan view of the substrate of FIG. 2A coated with an insulating layer.
Figure 2C:
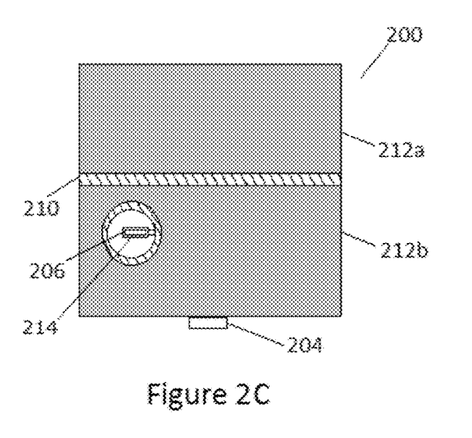
FIG. 2C is a schematic top plan view of the substrate of FIG. 2B coated with a bottom conductive layer.

Referring now to FIGS. 2A to 2C, a schematic of a direct-drive backplane 200 is illustrated. The backplane 200, similar to the FPL 100, may include a plurality of layers that may be flexible. The underlying substrate may be formed from an ablatable polymeric material, such as a polyimide, for example. The substrate may also include other optional layers such as a reflective/moisture barrier. Any method known by those of skill in the art may be used to fabricate a backplane for use in the lamination processes and laminated displays of the present invention, such as U.S. Pat. No. 7,223,672, the contents of which are incorporated by reference herein.

There are three main categories of backplanes: an active matrix, a passive matrix, and a direct drive backplane. Any type of backplane may be used in the various embodiments of the present invention in order to provide a top plane connection within the perimeter of the laminate.

For an active matrix backplane, an array of thin film transistors (TFT) are formed on the surface of a substrate and each transistor acts as a switch for a pixel. The TFT is addressed by a set of narrow multiplexed electrodes (gate lines and source lines) A pixel is addressed by applying voltage to a gate line that switches the TFT on and allows a charge from the source line to flow on to the rear electrode. This sets up a voltage across the pixel and turns it on.

Passive-matrix backplanes use a simple grid to supply the charge to a particular pixel on the display. The grids are formed on top and bottom substrates. One substrate forms the "columns" and the other substrate forms the "rows". The wiring of the column or rows is made from a transparent conductive material, usually indium-tin oxide (ITO). The rows or columns are connected to integrated circuits that control when a charge is sent down a particular column or row.

In the direct-drive backplane 200, the bottom substrate 202 may include an electrical connector 204 located on an edge of the substrate 202 from which a plurality of conductors 206, 207, 208 extends. Any method known by those of skill in the art may be used to trace the conductors 206, 207, 208 onto the surface of the substrate 202, such as plating methods. Among the plurality of conductors, one of the conductors 206 is used to form the top plane connection with the top conductive layer of the FPL. According to various embodiments of the invention, the conductor 206 used to form the top plane connection may include a cut-out 214, which will be described in greater detail below.

The substrate 202 of the direct drive backplane 200 will then be coated with an insulating layer 210, as illustrated in FIG. 2B. The insulating layer 210 is preferably made from a dielectric material, such as silicon nitride, an insulating polymer, or cross-linkable monomer or oligomer. The insulating layer 210 is applied to cover a majority of the conductive material, while leaving the end portions of the conductors 206, 207, 208 exposed. A segmented conductive layer 212a, 212b is then applied over the conductors 207, 208 that will not form part of the top plane connection, as illustrated in FIG. 2C. The segmented conductive layers 212a, 212b are applied such that each segment is electrically connected to a respective conductor 207, 208, which may be achieved by leaving an area of insulating material 210 between the segments 212a, 212b. The conductive layer is also applied in a manner that will avoid an electrical connection with conductor 206, which will form part of the top plane connection. For example, the conductive layer 212b may be applied such that a boundary of insulating layer 210 will remain between the conductor 206 and the conductive layer 212b, as illustrated in FIG. 2C.

Figure 2D:
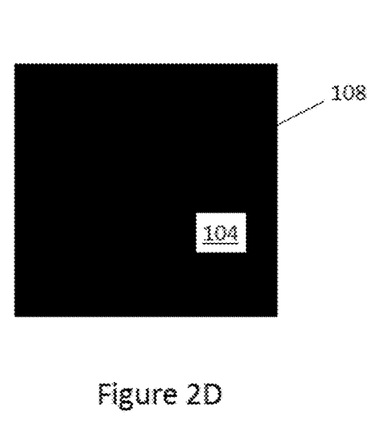
FIG. 2D is a schematic bottom plan view of the front plane laminate of FIG. 1 having a region of exposed top conductive layer.

Assembly of an electro-optic display using FPL 100 may be effected by removing the release sheet 110 and contacting the adhesive layer 108 with the backplane 200 under conditions effective to cause the adhesive layer 108 to adhere to the backplane 200, thereby securing the adhesive layer 108, layer of electro-optic medium 106 and electrically-conductive top layer 104 to the backplane 200, and then cut into pieces of any size needed for use with specific backplanes. However, referring to FIGS. 2C and 2D, the backplane 200 and FPL 100 must be laminated, such that the end of the conductor 206 is electrically connected only to a specific area of the top conductive layer 104 that is exposed through the adhesive layer 108, as illustrated in FIG. 21). Previously, this has been achieved by either cutting away or cleaning the FPL to expose the specific section of the top conductive layer that will contact the corresponding conductor in the backplane. If the section in the FPL is cut and cleaned prior to lamination to the backplane, the FPL must be precisely aligned to the backplane. This is especially difficult with large displays, in particular when fabricating prototypes or custom displays without alignment jigs. Alignment jigs are impractical for one-off, displays and may even be impossible for some odd shaped displays. If the section in the FPL is made after lamination, the cleaning process is likely to damage the top and/or backplane conductive layer.

Figure 3A:
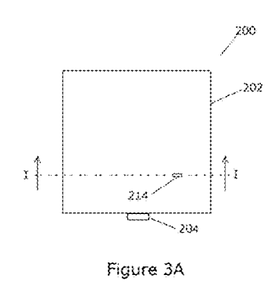
FIG. 3A is a schematic bottom plan view of a backplane laminated to a front plane laminate according to another embodiment of the present invention.
Figure 3B:
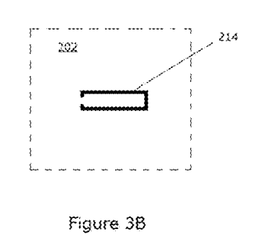
FIG. 3B is a magnified view of the tab of the backplane of FIG. 3A.
Figure 3C:
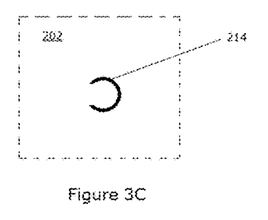
FIG. 3C is a magnified view of another embodiment of a tab for a backplane.

The process according to various embodiments of the present invention overcomes the disadvantages in previous lamination techniques by utilizing a cut-out 214 that is scored within the perimeter of an end portion of a conductor that forms a part of the top plane connection. To produce a display module according to an embodiment of the present invention, the FPL must first be laminated to a backplane having a cut-out. The FPL can be cut larger than the final display size and could even be a continuous sheet as in a roll-to-roll process. This allows for coarse tolerances in alignment of the FPL and backplane, which is especially helpful for large displays. Once laminated, the display can be cut to its final size, potentially using alignment marks or pins on the backplane to allow for precisely aligning the cut to the backplane. As illustrated in FIGS. 3A to 3C, the cut-out 214 in the rear surface of the backplane 200 may form a tab or flap, so that the cut-out 214 may be easily removed post-lamination of the backplane to the FPL. The cut-out may be provided in a variety of shapes, such as rectangular, circular, etc., and any method know to those of skill in the art for scoring a backplane material may be used, such as laser-cutting, for example. If the backplane is made of glass, laser-cutting may be used, as well as other methods, such as cutting or drilling with a diamond saw or drill, for example. If a diamond saw is utilized, a rectangular-shaped tab may be made from two substantially parallel cuts originating at the edge of the backplane, such as the tab 214 illustrated in FIG. 3E. Alternatively, the cuts may converge to form a tapered tab, similar to a triangular or trapezoidal shape, for example. In a less preferred embodiment, a hole may be drilled into the backplane and covered with a removable cover, such as a sticker, having an area at least as large as the opening. The removable cover would serve as the removable tab.

Figure 3D:
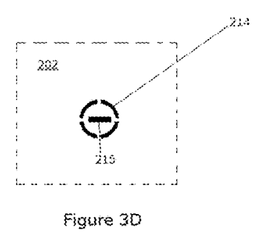
FIG. 3D is a magnified view of yet another embodiment of a cutout for a backplane.
Figure 3E:
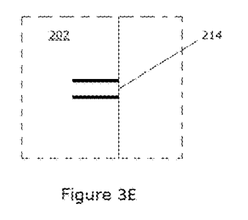
FIG. 3E is a magnified view of yet another embodiment of a cutout for a backplane.

In other embodiment of the present invention, the cut-out 214 may be a segmented circle and a slot 215 may be incorporated about the center of the segmented circle 214. The slot 215 may be dimensioned to receive a tool, such as a flat-head screwdriver, for example, and the thin strips of material separating the segments of the circle 214 may be sufficiently thin, such that rotation of the cut-out 214 with a tool will cause the thin strips of material to break and allow removal of the cut-out 214 from the substrate 202. The cut-out 214 may be divided into any number of segments, preferably at least two, and the slot 215 may be any shape that is able to mate with a tool. For example, the slot 215 may be in the form of a cross to accommodate a Philips screwdriver or a hexagon to accommodate an Allen wrench.

The lamination of the FPL to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive should have sufficient adhesive strength to bind the electro-optic layer to the backplane, and in the case of an encapsulated electrophoretic medium, the adhesive should also have sufficient adhesive strength to mechanically hold the capsules together. The adhesive is preferably chemically compatible with all the other materials in the display. If the electro-optic display is to be of a flexible type, the adhesive should have sufficient flexibility not to introduce defects into the display when the display is flexed. The lamination adhesive should have adequate flow properties at the lamination temperature to ensure high quality lamination. Furthermore, the lamination temperature is preferably as low as possible. An example of a useful lamination adhesive that may be incorporated in the various embodiments of the present invention an aqueous polyurethane dispersion known as a "TMXDI/PPO" dispersion, as described in U.S. Patent Application Publication No. 2005/0107564, the contents of which are incorporated by reference herein.

Figure 4:
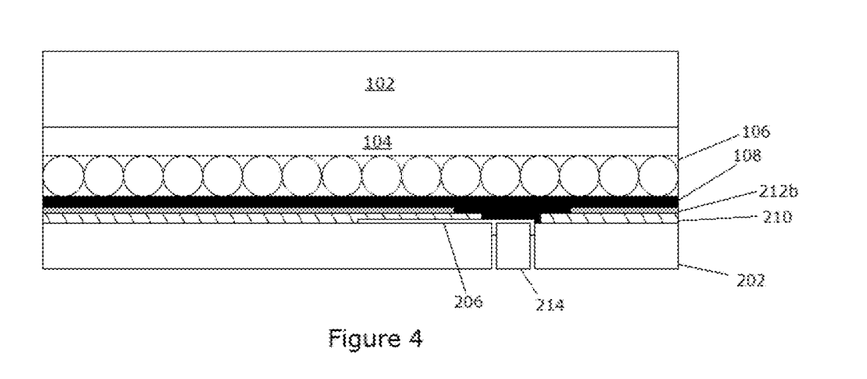
FIG. 4 is a schematic cross-section along axis I-I of the laminate of FIG. 3A.

Referring now to FIGS. 4 to 7, a process for making a top plane connection according to one embodiment of the present invention will now be described. FIGS. 4 to 7 are a partial schematic cross-section along axis I-I of FIG. 3A. As illustrated in FIG. 4, the cut-out 214 in the substrate 202 of the backplane was incorporated prior to formation of the conductor 206.

Figure 7:
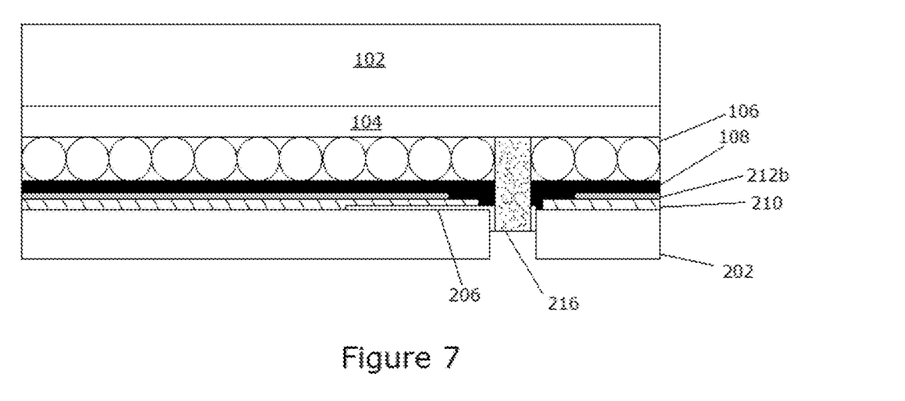
FIG. 7 is a schematic cross-section of the laminate of FIG. 6 after a void has been filled with a conductive material.

As a result of the plating operation to form the conductor 206, the material of the conductor 206 fills the space between the cut-out 214 and the substrate 202. Therefore, it is preferred to form the cut-out 214 prior to forming the conductors 206, as best shown in FIG. 7, in order to increase the surface contact area of the portion of the conductor that will form the top plane connector. It is also preferred to provide a cut-out 214 in the form of a tab, for example, rather than a through-hole in the substrate 202 to provide a backing for the FPL during the lamination process and reduce the likelihood of forming a divot or deformation in the surface of the FPL over the area of the through-hole.

Figure 5:
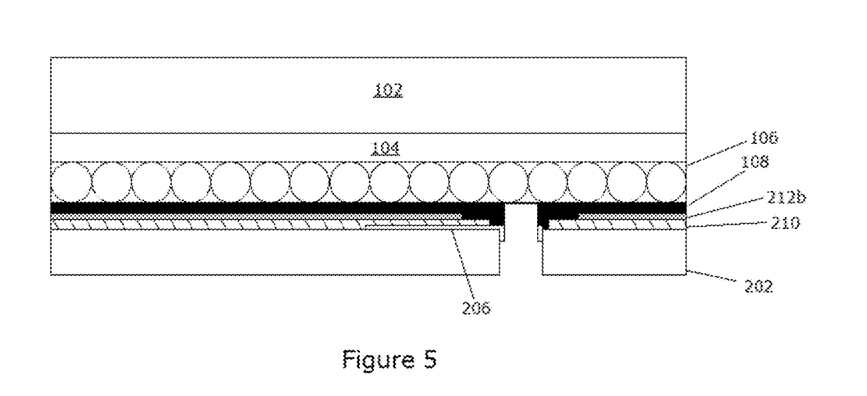
FIG. 5 is a schematic cross-section of the laminate of FIG. 4 after the tab has been removed from the backplane.
Figure 6:
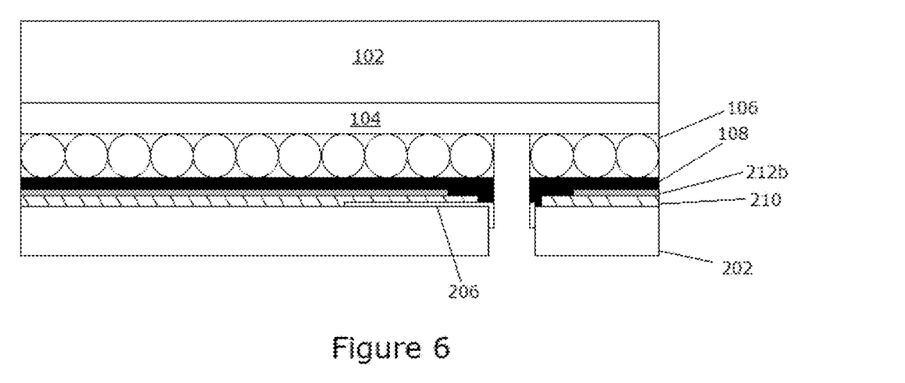
FIG. 6 is a schematic cross-section of the laminate of FIG. 5 after a portion of the electro-optic media has been removed.

After the lamination step, the cut-out 214 may be removed, as illustrated in FIG. 5. Because the adhesive layer 108 is laminated to the substrate 202, removal of the cut-out 214 will also result in removal in the section of the adhesive layer 108. Therefore, removal of the cut-out 214 will accomplish a substantial portion of the cleaning required to expose the top conductive layer 104. In order to expose the top conductive layer 104, a solvent may be used in a manual or automated cleaning process to expose a portion of the electro-optic medium 106 within the boundary of the through-hole, as illustrated in FIG. 6. The solvent should be selected that will dissolve the electro-optic layer without damaging the top conductive layer. The size of the cut-out should be selected, such that sufficient space is provided following its removal to allow for ease and efficiency of cleaning and to maximize the surface area for electrical contact with the overlying conductor.

Once the top conductive layer 104 is exposed, a conductive material 216 may be filled in the open space to electrically connect the conductor 206 to the top conductive layer 104, thus forming the top plane connection. The conductive material may be any conductive filler known to those of skill in the art, such as a silver or carbon filled epoxy. In a final step, an insulating barrier (not shown) may be applied over any conductive filler by laminating or dispensing a thin layer of insulating material over an area that is at least as large as the area of the conductive filler on the exposed side of the backplane.

Figure 8:
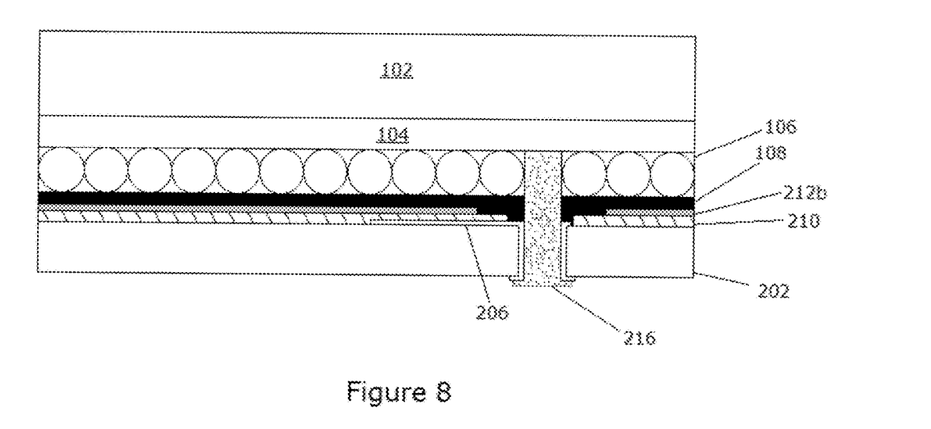
FIG. 8 is a schematic cross-section of a laminate according to another embodiment of the invention after a void has been filled with a conductive material.

In another embodiment of the present invention, a double-sided backplane may be incorporated into the laminate. A double-sided backplane differs from the backplane illustrated in FIGS. 4 to 7 in that the material used to the form the conductor for the top plane connection may be printed on both sides of the backplane substrate. As illustrated in the example of FIG. 8, the material used to form the conductor 206 has been printed on both sides of the substrate 202, such that the conductor 206 will cover generally the entirety of the through-hole formed after removal of the cut-out. The remaining steps of the top plane connection process will be the same as those described above. By using a double-sided backplane, the surface area of the conductor is larger relative to the embodiment illustrated in FIGS. 4 to 7. This allows for more connection surface area between the conductor in the backplane and the conductive fill material which will be dispensed into the plated through-hole via.

A double sided backplane, similar to a single sided backplane, may be produced by known PCB or flex-PCB techniques as well as by screen printing. The extra screen printing step, where conductor material is applied to the bottom side of the substrate around the cut-out would add extra area for making the top plane connection thereby improving the overall display reliability.

Figure 9:
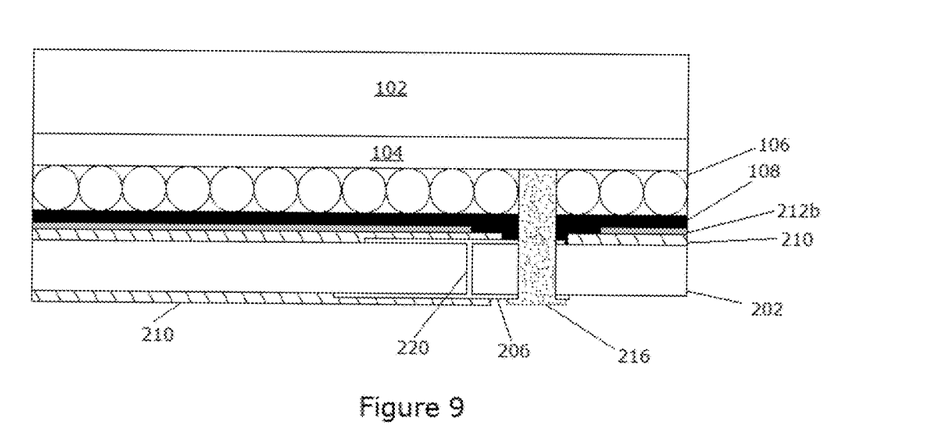
FIG. 9 is a schematic cross-section of a laminate according to yet another embodiment of the invention after a void has been filled with a conductive material.

Another embodiment comprising a double sided backplane is illustrated in FIG. 9. For certain configurations of screen printed backplanes, for example, the through-hole created by removing the cut-out to form the top plane connection may not be ideally sized, such that it may simultaneously be used as a conductive via. The embodiment illustrated in FIG. 9 instead provides two separate pathways through the substrate 202, one conductive via 220 for the conductor 206, which is screen printed on both sides of the substrate 202 and covered with an insulating layer 210, as well as one through-hole filled with conductive material 216 to from the top plane connection between the conductor 206 and the top conductive layer 104. In this embodiment, the laminate may include a plurality of vias to ensure connectivity between the screen printed conductors on either side of the backplane substrate and the conductive layer on the walls of the through-hole for the top plane connection is not necessary.

Thus, the various embodiments of the present invention simplify the production of custom large area displays where alignment jigs and other equipment are not available for precision aligned lamination. It also makes possible the use of roll-to-roll production of displays using continuous rolls of FPL and backplane. The electrical connection between the top conductive layer and the backplane will be robust and reliable due to the relatively large area of exposed top conductive layer. For architectural applications of electro-optic displays that require large and sometimes unique coverage areas, small volume orders can be made with high yield, especially in applications in which the TPC cannot be hidden behind a bezel or frame and must be small. The small TPC provided using the process according various embodiments of the invention may be highly desirable in such applications.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. A method of forming an electro-optic display comprising:
    forming a front plane laminate comprising, in this order, a first substrate, a first conductive layer, a layer of an electro-optic medium, and an adhesive, the first substrate and first conductive layer being transparent;
    coating an insulating layer and a second conductive layer onto a second substrate comprising a plurality of conductors to provide a backplane;
    scoring the second substrate to form a removable portion;
    laminating the front plane laminate to the backplane, such that the layer of electro-optic medium is between the first conductive layer and one of the plurality of conductors;
    removing the portion from the second substrate to provide an opening through the backplane and the layer of electro-optic medium; and
    filling the opening with a conductive material to provide an electrical connection between the first conductive layer and the one conductor.

2. The method of claim 1, wherein the portion in the second substrate is scored in proximity to the one conductor.

3. The method of claim 1, wherein the scoring step occurs prior to coating the second substrate with the insulating layer and the second conductive layer.

4. The method of claim 1, wherein the removing step exposes at least one of the electro-optic medium and the adhesive within the opening.

5. The method of claim 4 further comprising removing at least some of the electro-optic medium and adhesive within the opening after the laminating step to expose the first conductive layer.

6. The method of claim 1, wherein the portion of the second substrate is in the form of a flap.

7. The method of claim 1, wherein the second conductive layer is applied to two opposing surfaces of the second substrate.

8. The method of claim 1, wherein the portion is removed prior to the laminating step.

9. The method of claim 8, wherein the one conductor is plated onto the surface of the opening prior to coating the second substrate with the insulating layer and the second conductive layer.

10. A laminated electro-optic display comprising:
    a front transparent substrate;
    a rear substrate having a plurality of conductors; and
    a plurality of layers between the front substrate and the rear substrate, the plurality of layers comprising a layer of an electro-optic medium, a first conductive layer positioned between the front substrate and the electro-optic medium, and a second conductive layer positioned between the electro-optic medium and the rear substrate,
    wherein the rear substrate includes a through-hole filled with a conductive material such that at least one of the plurality of conductors is electrically connected via the conductive material to the first conductive layer.

11. The method of claim 1, wherein the electro-optic medium is an electrophoretic medium.

12. The display of claim 10, wherein the electro-optic medium is an electrophoretic medium.

\* \* \* \* \*